United States Patent
Iwase

(10) Patent No.: US 11,756,259 B2
(45) Date of Patent: Sep. 12, 2023

(54) DISPLAY CONTROLLING DEVICE, DISPLAY CONTROLLING METHOD, PROGRAM, AND NON-TRANSITORY COMPUTER-READABLE INFORMATION RECORDING MEDIUM

(71) Applicant: Rakuten Group, Inc., Tokyo (JP)

(72) Inventor: Hiroaki Iwase, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/041,039

(22) PCT Filed: Apr. 17, 2019

(86) PCT No.: PCT/JP2019/016458
§ 371 (c)(1),
(2) Date: Sep. 24, 2020

(87) PCT Pub. No.: WO2020/213088
PCT Pub. Date: Oct. 22, 2020

(65) Prior Publication Data
US 2021/0248809 A1    Aug. 12, 2021

(51) Int. Cl.
*G06T 15/20* (2011.01)
*H04N 13/332* (2018.01)
*H04N 13/383* (2018.01)

(52) U.S. Cl.
CPC .......... *G06T 15/20* (2013.01); *H04N 13/332* (2018.05); *H04N 13/383* (2018.05)

(58) Field of Classification Search
CPC ..... G06T 15/20; H04N 13/332; H04N 13/383
See application file for complete search history.

(56) References Cited

U.S. PATENT DOCUMENTS

| | | | | |
|---|---|---|---|---|
| 5,742,264 A | * | 4/1998 | Inagaki | G09G 5/397 348/E5.145 |
| 6,097,927 A | * | 8/2000 | LaDue | G09B 5/14 434/323 |

(Continued)

FOREIGN PATENT DOCUMENTS

| | | |
|---|---|---|
| JP | 09-50541 A | 2/1997 |
| JP | 2010-114618 A | 5/2010 |

(Continued)

OTHER PUBLICATIONS

International Search Report for PCT/JP2019/016458 dated Jul. 16, 2019 [PCT/ISA/210].

(Continued)

*Primary Examiner* — Charles L Beard
(74) *Attorney, Agent, or Firm* — Sughrue Mion, PLLC

(57) ABSTRACT

A sensor unit (105) included in a display device (100) detects a shift in orientation of a display (104) included in the display device (100) in a real space. A display control device configured by a control unit (101) changes the sight line direction in a virtual space, which includes a plurality of still and moving objects, in accordance with the detected shift in orientation, and generates an image representing a view of the virtual space in the sight line direction. The generated image is displayed on the display (104). The display control device configured by the control unit (101) then specifies a focus object among the objects, transfers an observation site about the focus object in the direction opposite to the direction of change in the sight line direction, and then generates the image of the virtual space from the observation site in the sight line direction.

15 Claims, 14 Drawing Sheets

(56) References Cited

U.S. PATENT DOCUMENTS

| | | | |
|---|---|---|---|
| 6,377,277 B1* | 4/2002 | Yamamoto | A63F 13/57 |
| | | | 345/629 |
| 6,611,283 B1* | 8/2003 | Isonuma | H04N 13/117 |
| | | | 348/51 |
| 9,613,459 B2* | 4/2017 | Ng-Thow-Hing | G06F 3/147 |
| 10,115,312 B2* | 10/2018 | Lee | G08G 1/0962 |
| 10,272,780 B2* | 4/2019 | Yoshida | B60K 35/00 |
| 10,354,153 B2* | 7/2019 | Kunichika | B60R 1/00 |
| 10,410,418 B2* | 9/2019 | Kiuchi | G06T 19/006 |
| 10,412,527 B1* | 9/2019 | Miller | H04S 7/303 |
| 10,469,769 B1* | 11/2019 | Mukherjee | G06F 3/011 |
| 10,535,199 B1* | 1/2020 | Bond | G06T 15/08 |
| 10,539,797 B2* | 1/2020 | Nakashima | G02B 27/017 |
| 10,612,912 B1* | 4/2020 | Sullivan | G01B 11/22 |
| 10,636,193 B1* | 4/2020 | Sheikh | G06V 20/20 |
| 10,901,215 B1* | 1/2021 | Newcombe | G02B 27/0172 |
| 11,006,102 B2* | 5/2021 | Zhou | H04N 13/243 |
| 11,032,535 B2* | 6/2021 | Lutter | H04N 19/162 |
| 11,126,848 B2* | 9/2021 | Cheng | G06K 9/00671 |
| 11,192,026 B2 | 12/2021 | Okamura | |
| 11,245,836 B2* | 2/2022 | Lei | H04N 23/60 |
| 11,394,949 B2* | 7/2022 | Chapman | H04N 23/54 |
| 2004/0110565 A1* | 6/2004 | Levesque | A63F 13/803 |
| | | | 463/36 |
| 2008/0211771 A1* | 9/2008 | Richardson | A63F 13/10 |
| | | | 345/158 |
| 2008/0218436 A1* | 9/2008 | Lipscomb | G02B 27/017 |
| | | | 345/8 |
| 2009/0163274 A1* | 6/2009 | Kando | A63F 13/577 |
| | | | 463/31 |
| 2010/0253541 A1* | 10/2010 | Seder | G08G 1/0962 |
| | | | 340/905 |
| 2011/0014977 A1* | 1/2011 | Yamazaki | A63F 13/5255 |
| | | | 463/43 |
| 2011/0273543 A1* | 11/2011 | Ushio | H04N 13/261 |
| | | | 348/54 |
| 2012/0215403 A1* | 8/2012 | Tengler | B60K 35/00 |
| | | | 701/36 |
| 2012/0224060 A1* | 9/2012 | Gurevich | G06V 20/58 |
| | | | 348/148 |
| 2013/0021373 A1* | 1/2013 | Vaught | G06F 3/013 |
| | | | 345/633 |
| 2014/0002439 A1* | 1/2014 | Lynch | G01C 21/367 |
| | | | 345/419 |
| 2014/0019005 A1* | 1/2014 | Lee | G08G 1/0962 |
| | | | 701/301 |
| 2014/0085203 A1* | 3/2014 | Kobayashi | G06F 3/012 |
| | | | 345/158 |
| 2014/0146148 A1* | 5/2014 | Maciocci | G06F 3/013 |
| | | | 348/59 |
| 2014/0236483 A1* | 8/2014 | Beaurepaire | G01C 21/365 |
| | | | 701/533 |
| 2014/0268353 A1* | 9/2014 | Fujimura | G02B 27/0101 |
| | | | 359/630 |
| 2014/0285641 A1* | 9/2014 | Kato | H04N 13/106 |
| | | | 348/54 |
| 2014/0362195 A1* | 12/2014 | Ng-Thow-Hing | G06V 40/20 |
| | | | 348/51 |
| 2015/0023589 A1* | 1/2015 | Kataoka | G06T 15/20 |
| | | | 382/154 |
| 2015/0035954 A1* | 2/2015 | Hoffman | H04N 13/128 |
| | | | 348/54 |
| 2015/0106767 A1* | 4/2015 | Abercrombie | G06F 3/04842 |
| | | | 715/848 |
| 2015/0371446 A1* | 12/2015 | Kuehne | G06F 3/04815 |
| | | | 345/633 |
| 2016/0003636 A1* | 1/2016 | Ng-Thow-Hing | G06V 20/588 |
| | | | 701/418 |
| 2016/0155267 A1* | 6/2016 | Bean | G02B 27/017 |
| | | | 345/633 |
| 2016/0231578 A1* | 8/2016 | Hardison | G02B 30/36 |
| 2016/0246365 A1* | 8/2016 | Bedell, Jr. | G06F 3/14 |
| 2016/0320625 A1* | 11/2016 | von und zu Liechtenstein | |
| | | | G02B 27/0179 |
| 2016/0337630 A1* | 11/2016 | Raghoebardajal | A63F 13/212 |
| 2016/0366392 A1* | 12/2016 | Raghoebardajal | H04N 13/332 |
| 2016/0379498 A1* | 12/2016 | Aoki | G09G 3/001 |
| | | | 340/436 |
| 2017/0053452 A1* | 2/2017 | Arai | G02B 27/0093 |
| 2017/0083084 A1* | 3/2017 | Tatsuta | G06F 3/011 |
| 2017/0153709 A1* | 6/2017 | Kondo | G06F 3/04815 |
| 2017/0272838 A1* | 9/2017 | Glazer | G06F 3/012 |
| 2017/0352277 A1* | 12/2017 | Lee | G08G 1/166 |
| 2017/0360295 A1* | 12/2017 | Oz | G06V 10/25 |
| 2017/0372516 A1* | 12/2017 | Evans | G02B 27/017 |
| 2018/0003979 A1* | 1/2018 | Nakashima | G02B 27/017 |
| 2018/0007255 A1* | 1/2018 | Tang | G06V 40/193 |
| 2018/0059779 A1* | 3/2018 | Sisbot | G06T 19/20 |
| 2018/0061121 A1* | 3/2018 | Yeoh | G06T 19/003 |
| 2018/0077409 A1* | 3/2018 | Heo | H04N 13/383 |
| 2018/0090002 A1* | 3/2018 | Arita | G02B 27/0101 |
| 2018/0095542 A1* | 4/2018 | Mallinson | G06T 19/006 |
| 2018/0095635 A1* | 4/2018 | Valdivia | G06F 3/0482 |
| 2018/0095636 A1* | 4/2018 | Valdivia | G06F 3/0482 |
| 2018/0096506 A1* | 4/2018 | Valdivia | G06T 15/20 |
| 2018/0096507 A1* | 4/2018 | Valdivia | G06F 3/04842 |
| 2018/0098059 A1* | 4/2018 | Valdivia | G06F 3/011 |
| 2018/0131926 A1* | 5/2018 | Shanks | H04N 13/344 |
| 2018/0154860 A1* | 6/2018 | Thieberger | B60R 21/0136 |
| 2018/0156960 A1* | 6/2018 | Tseng | G02F 1/133621 |
| 2018/0178812 A1* | 6/2018 | Kassner | G06V 20/20 |
| 2018/0239145 A1* | 8/2018 | Lanman | G06F 3/013 |
| 2018/0259775 A1* | 9/2018 | Ono | G06F 3/04815 |
| 2018/0308290 A1* | 10/2018 | Perez | G06F 3/011 |
| 2018/0314326 A1* | 11/2018 | Terahata | G06T 19/006 |
| 2018/0330532 A1* | 11/2018 | Hurter | G06V 20/52 |
| 2018/0373325 A1* | 12/2018 | Rosso | G06F 3/013 |
| 2018/0373328 A1* | 12/2018 | Sawaki | G02B 27/017 |
| 2019/0045178 A1* | 2/2019 | Lutter | G06F 3/011 |
| 2019/0052869 A1* | 2/2019 | Lutter | G06F 3/011 |
| 2019/0052870 A1* | 2/2019 | Lutter | G06T 19/003 |
| 2019/0073830 A1* | 3/2019 | Fujimoto | G06F 3/013 |
| 2019/0088011 A1* | 3/2019 | Liu | G06T 15/20 |
| 2019/0110039 A1* | 4/2019 | Linde | H04N 13/296 |
| 2019/0132569 A1* | 5/2019 | Karpenko | G06T 3/0062 |
| 2019/0166360 A1* | 5/2019 | Holliman | H04N 13/398 |
| 2019/0188895 A1* | 6/2019 | Miller, IV | G06F 3/017 |
| 2019/0193632 A1* | 6/2019 | Lewis | G06T 7/521 |
| 2019/0213793 A1* | 7/2019 | Balan | G06T 15/20 |
| 2019/0213975 A1* | 7/2019 | Nakata | G09G 5/14 |
| 2019/0220089 A1* | 7/2019 | Kakizawa | G02B 27/017 |
| 2019/0222830 A1* | 7/2019 | Edwin | G06F 3/04815 |
| 2019/0244416 A1* | 8/2019 | Tamaoki | G09G 5/377 |
| 2019/0244429 A1* | 8/2019 | Flaherty-Woods | G06T 19/006 |
| 2019/0250792 A1* | 8/2019 | Abercrombie | G06F 3/017 |
| 2019/0271840 A1* | 9/2019 | Kishigami | G02B 27/0101 |
| 2019/0287313 A1* | 9/2019 | Kavallierou | G06T 13/40 |
| 2019/0300003 A1* | 10/2019 | Shiraishi | G06F 3/011 |
| 2019/0311232 A1* | 10/2019 | Hall | G06F 3/013 |
| 2019/0311527 A1* | 10/2019 | Schwab | G06F 3/011 |
| 2019/0324634 A1* | 10/2019 | Gao | G06T 19/006 |
| 2019/0335166 A1* | 10/2019 | Copley | H04N 13/167 |
| 2019/0336858 A1* | 11/2019 | Nozaki | A63F 13/5375 |
| 2019/0349575 A1* | 11/2019 | Knepper | G06F 3/012 |
| 2019/0369718 A1* | 12/2019 | Wei | H04N 13/344 |
| 2019/0384378 A1* | 12/2019 | Ebert | G02B 27/0176 |
| 2020/0018952 A1* | 1/2020 | Lewis | G06T 7/246 |
| 2020/0018976 A1* | 1/2020 | Van Wiemeersch | B60K 35/00 |
| 2020/0035206 A1* | 1/2020 | Hamaker | G06F 3/013 |
| 2020/0051528 A1* | 2/2020 | Huang | G06F 3/013 |
| 2020/0057487 A1* | 2/2020 | Sicconi | G06T 7/254 |
| 2020/0090375 A1* | 3/2020 | Mori | G02B 27/01 |
| 2020/0126276 A1* | 4/2020 | Rakshit | G10L 25/84 |
| 2020/0134895 A1* | 4/2020 | Pollard | G06F 3/016 |
| 2020/0150751 A1* | 5/2020 | Laaksonen | H04S 3/008 |
| 2020/0180502 A1* | 6/2020 | Mitsuya | G08G 1/166 |
| 2020/0184218 A1* | 6/2020 | Cheng | G06V 40/18 |
| 2020/0192550 A1* | 6/2020 | Laaksonen | G06F 3/011 |
| 2020/0202597 A1* | 6/2020 | Stokking | G06T 19/003 |
| 2020/0234495 A1* | 7/2020 | Nakao | H04N 21/6587 |
| 2020/0279407 A1* | 9/2020 | Liljeroos | G06T 3/40 |

(56) References Cited

U.S. PATENT DOCUMENTS

| | | | |
|---|---|---|---|
| 2020/0296354 A1* | 9/2020 | Bickerstaff | G02B 27/017 |
| 2020/0307437 A1* | 10/2020 | Thieberger | B62D 47/006 |
| 2020/0322595 A1* | 10/2020 | Abe | H04N 13/383 |
| 2020/0357163 A1* | 11/2020 | Wang | G06F 3/04815 |
| 2020/0379253 A1* | 12/2020 | Hasharoni | G02B 27/0172 |
| 2020/0406747 A1* | 12/2020 | Sakai | G08G 1/167 |
| 2020/0410746 A1* | 12/2020 | Shin | G06T 5/005 |
| 2021/0019942 A1* | 1/2021 | Ophir | G06T 19/006 |
| 2021/0080727 A1* | 3/2021 | Yamada | G02B 30/22 |
| 2021/0081051 A1* | 3/2021 | Laaksonen | G06F 3/011 |
| 2021/0088790 A1* | 3/2021 | Forster | G02B 27/017 |
| 2021/0097875 A1* | 4/2021 | Alexander, IV | G06F 3/017 |
| 2021/0106219 A1* | 4/2021 | Gibson | G02B 26/101 |
| 2021/0110596 A1* | 4/2021 | Ishikawa | G06F 3/011 |
| 2021/0122388 A1* | 4/2021 | Qiu | B60W 40/10 |
| 2021/0144359 A1* | 5/2021 | Kurata | H04N 13/383 |
| 2021/0157406 A1* | 5/2021 | Leppänen | G06F 3/011 |
| 2021/0264679 A1* | 8/2021 | Liu | G06T 7/73 |
| 2021/0405744 A1* | 12/2021 | Walker | H04N 13/282 |
| 2022/0065651 A1* | 3/2022 | Beaurepaire | G01C 21/3661 |
| 2022/0091722 A1* | 3/2022 | Faulkner | G06T 19/003 |
| 2022/0187907 A1* | 6/2022 | Lee | G06F 3/04842 |
| 2022/0214743 A1* | 7/2022 | Dascola | G06F 3/011 |
| 2022/0309722 A1* | 9/2022 | Hoover | G06F 3/013 |
| 2022/0362667 A1* | 11/2022 | Kuwahara | G02B 27/017 |

FOREIGN PATENT DOCUMENTS

| | | |
|---|---|---|
| JP | 5961892 B1 | 8/2016 |
| JP | 2016-162426 A | 9/2016 |
| WO | 2018/131574 A1 | 7/2018 |

OTHER PUBLICATIONS

International Search Report for PCT/JP2019/016458 dated Jul. 16, 2019.

* cited by examiner

DISPLAY CONTROLLING DEVICE, DISPLAY CONTROLLING METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2019/016458 filed Apr. 17, 2019.

TECHNICAL FIELD

The present disclosure relates to a display control device, a display control method, a program, and a non-transitory computer-readable information recording medium.

BACKGROUND ART

Some methods have been known for displaying an area or object that is hidden behind an obstacle and is hardly visible when viewed from a user. For example, Patent Literature 1 discloses a method of taking an image of a blind area of a driver with a camera, converting the taken image into an image from the view point of the driver, and displaying the resulting image and a translucent image of a vehicle from the view point of the driver in a superimposed manner.

CITATION LIST

Patent Literature

Patent Literature 1: Unexamined Japanese Patent Application Kokai Publication No. 2010-114618

SUMMARY OF INVENTION

Technical Issue

In some techniques related to a virtual reality system, augmented reality system, or substitutional reality system, the system detects the orientation of a user wearing a head mounted display, changes the sight line direction in a three-dimensional space in accordance with the detected orientation, generates an image representing a view of the three-dimensional space in the sight line direction, and causes the image to be displayed on the head mounted display. In the technique disclosed in Patent Literature 1, the image of the blind area and the translucent image of the vehicle are displayed in a superimposed manner on the preliminary assumption that the driver pays attention to the blind area of the driver.

If a display device has an ability to detect the position of the display device, a system is capable of display control by transferring the observation site in the virtual space in accordance with movement of the head of a user. This configuration enables the user to observe a portion of an object hidden behind another object, for example, when the user moves the head so as to look into the space behind the other object for the hidden portion.

Unfortunately, if the display device has no ability to detect the position of the display device in the real space, the system is incapable of display control in accordance with movement of the user's head and thus cannot achieve observation of the hidden portion. If the display device has an ability to detect the position of the display device in the real space with a low detection accuracy, the system may fail to transfer the observation site to an appropriate site and cannot achieve appropriate observation of the hidden portion.

The disclosure, which has been accomplished to solve the above issues, is to provide a display control device that causes a display device to display a view of a virtual space or the like from an observation site in the virtual space or the like and appropriately transfers the observation site in the virtual space or the like without detection of the position of the display device in a real space, and to provide a display control method, a program, and a non-transitory computer-readable information recording medium.

Solution to Issue

A display control device according to one aspect of the disclosure for solving the above issues controls a display device. The display control device: changes a sight line direction in a virtual space, which includes a plurality of still and moving objects, in accordance with a shift in orientation of the display device in a real space; generates an image representing a view of the virtual space in the sight line direction; and causes the generated image to be displayed on a display included in the display device. The display control device specifies a focus object among the objects, transfers an observation site about the focus object toward a direction opposite to a direction of change in the sight line direction, and generates the image representing a view of the virtual space from the observation site in the sight line direction.

A display control method performed by the above-described display control device can be achieved when a computer connected to or integrated with the display device executes a program stored on a non-transitory computer-readable information recording medium or the like and functions as the display control device for controlling the display device.

This non-transitory information recording medium can be distributed and sold independently from computers. The non-transitory information recording medium indicates a tangible information recording medium. Examples of the non-transitory information recording medium include a compact disk, flexible disk, hard disk, magnetic disk, digital video disk, magnetic tape, and semiconductor memory. In contrast, a transitory information recording medium indicates a transmission medium (transmission signal) itself. Examples of the transitory recording medium include an electrical signal, optical signal, and electromagnetic wave. A temporary storage area indicates an area for temporarily storing data and programs. A typical example of the temporary storage area is a volatile memory, such as a random access memory (RAM).

Advantageous Effects of Invention

According to the disclosure, a display control device, which causes a display device to display a view of a virtual space or the like from an observation site in the virtual space or the like, can appropriately transfer the observation site in the virtual space or the like without detection of the position of the display device in a real space.

DESCRIPTION OF EMBODIMENTS

An embodiment of the disclosure will now be described. This embodiment is provided for exemplary purposes only and does not limit the scope of the disclosure. Persons skilled in the art can replace some or all of the components of the embodiment with their equivalents to configure other embodiments, which are also encompassed in the scope of the disclosure. The embodiment of the disclosure will now be described with reference to the accompanying drawings, in which the identical or corresponding components are provided with the same reference symbol.

Figure 1:
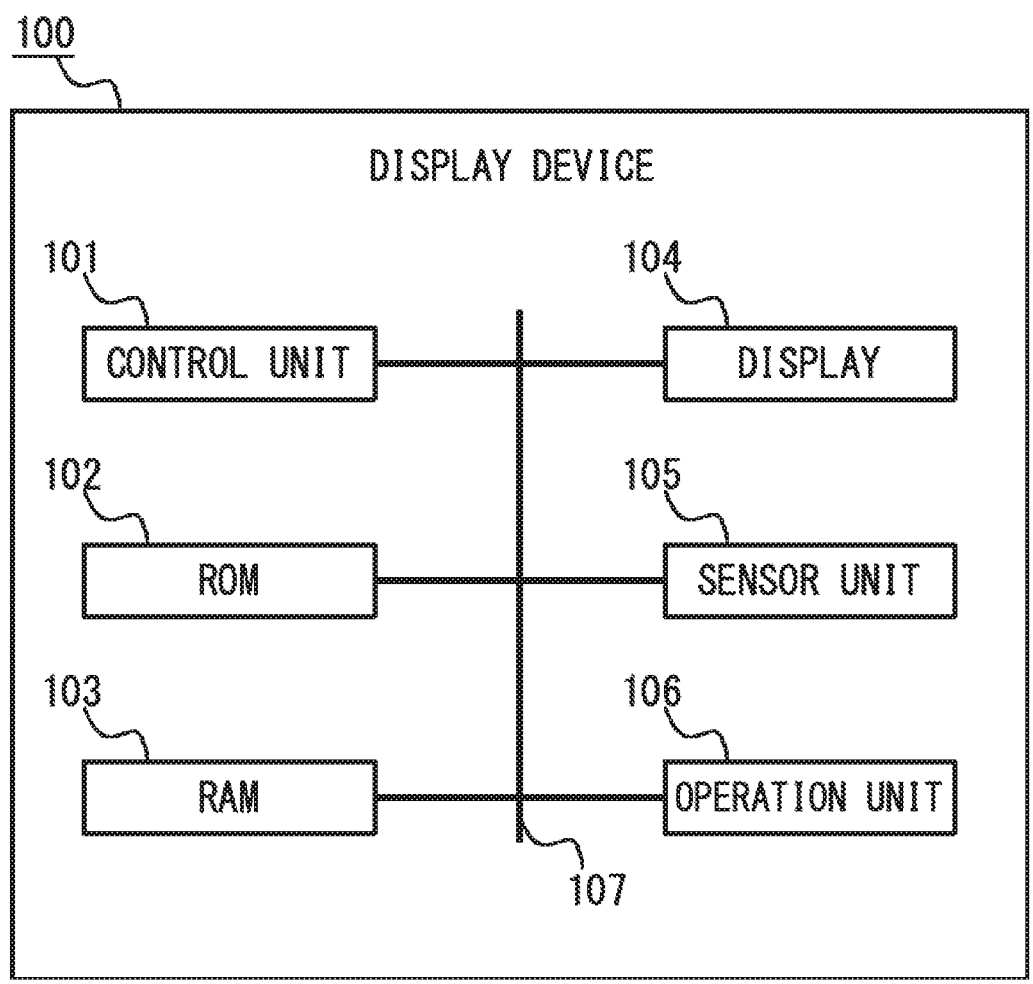
FIG. 1 is a schematic block diagram illustrating a hardware configuration of a display device according to an embodiment.

FIG. 1 is a schematic block diagram illustrating a hardware configuration of a display device 100 according to the embodiment. The display device 100 includes, for example, a head mounted display equipped with various sensors and controllers.

The head mounted display may be provided with a computer (for example, smartphone, tablet computer, or phablet) installed in an attachment of the head mount display. In this case, the display device 100 is achieved by execution of a program in the computer (for example, smartphone) for causing the computer to function as the above-described components.

Alternatively, the display device 100 may be configured by a head mounted display equipped with various sensors and a display screen and a computer connected to the head mounted display via wire or wireless communication for controlling the head mounted display. In this case, the computer acquires values measured by the sensors from the head mounted display, generates an image based on the measured values, and causes the image to be displayed on the display screen of the head mounted display.

With reference to FIG. 1, the display device 100 is composed of a control unit 101, a read only memory (ROM) 102, a RAM 103, a display 104, a sensor unit 105, and an operation unit 106. These components are connected to each other via buses 107.

The control unit 101 includes, for example, a central processing unit (CPU) and controls the entire display device 100.

The ROM 102 is a non-volatile memory that stores programs and various types of data for enabling the control unit 101 to control the entire display device 100.

The RAM 103 is a volatile memory that temporarily stores information generated by the control unit 101 and data necessary for generation of the information.

The display 104 includes a liquid crystal display (LCD) and backlights. The display 104 displays, for example, an image output from the control unit 101 under the control of the control unit 101.

The sensor unit 105 is equipped with an orientation sensor and an acceleration sensor to detect the orientation of the display device 100, that is, the orientation of the display 104. The sensor unit 105 may detect a shift in orientation instead of detecting the orientation itself.

The operation unit 106 includes input components, such as buttons, a keyboard, and a touch panel. The operation unit 106 receives an operation input from a user of the display device 100 and outputs a signal corresponding to the received operation to the control unit 101.

In the above example, the display control device according to the embodiment is configured by the control unit 101 that controls the display device 100 in cooperation with the ROM 102 and the RAM 103. The display device 100 is integrated with the display control device in such a manner as to include the display control device.

Alternatively, the control unit 101, the ROM 102, and the RAM 103 may be configured by an external computer communicatively connected to a head mounted display. The display 104 and the sensor unit 105 may be the constituent elements of the head mounted display connected to this computer. The operation unit 106 may be input components connected to this computer. In this case, the display control device according to the embodiment is achieved outside the head mounted display by cooperation of the control unit 101 with the ROM 102 and the RAM 103. This display control device controls the display device 100 including the display 104 and the sensor unit 105 of the head mounted display.

Figure 2:
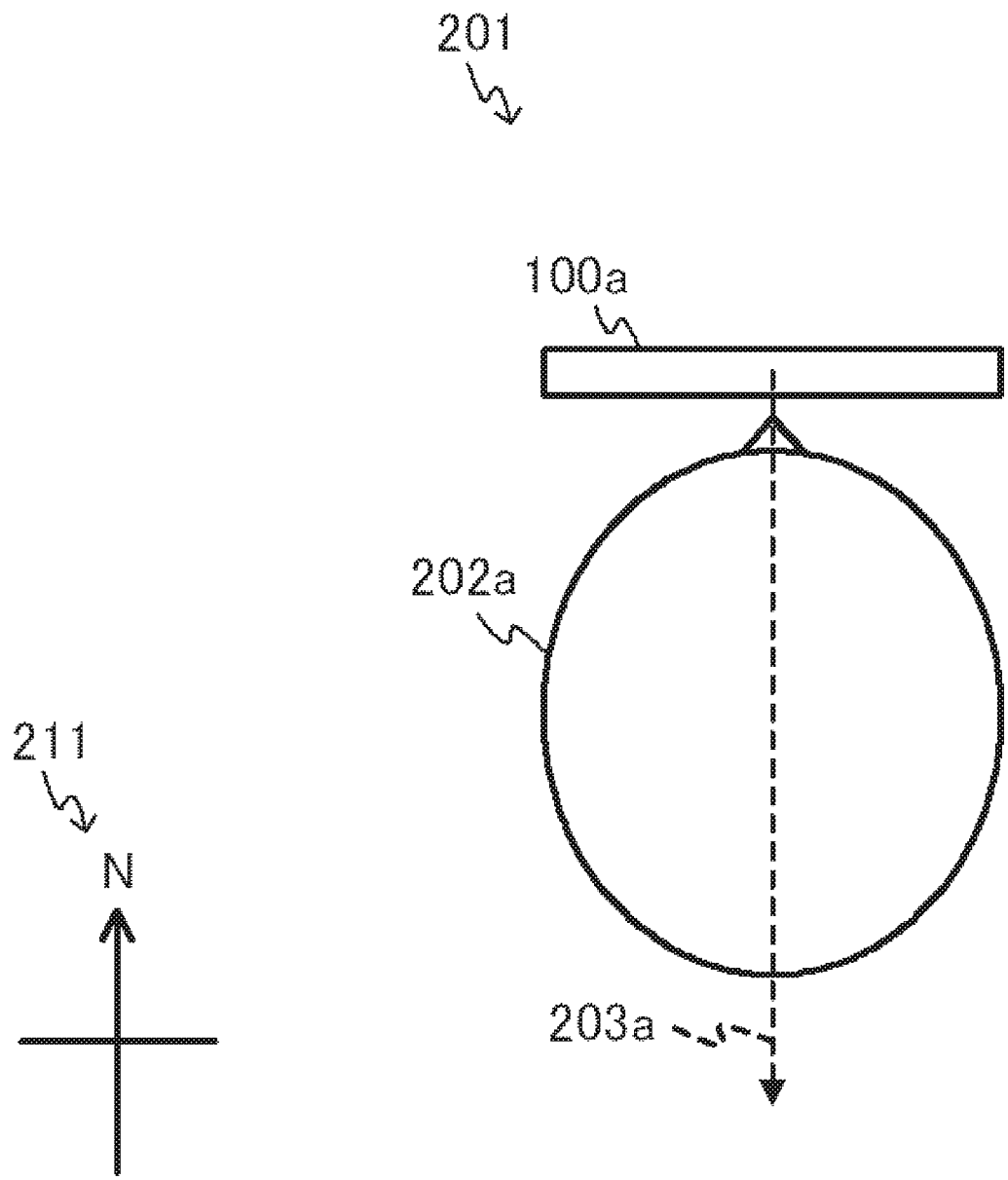
FIG. 2 is a top view of a real space before a shift in orientation of a display device and a user.
Figure 3:
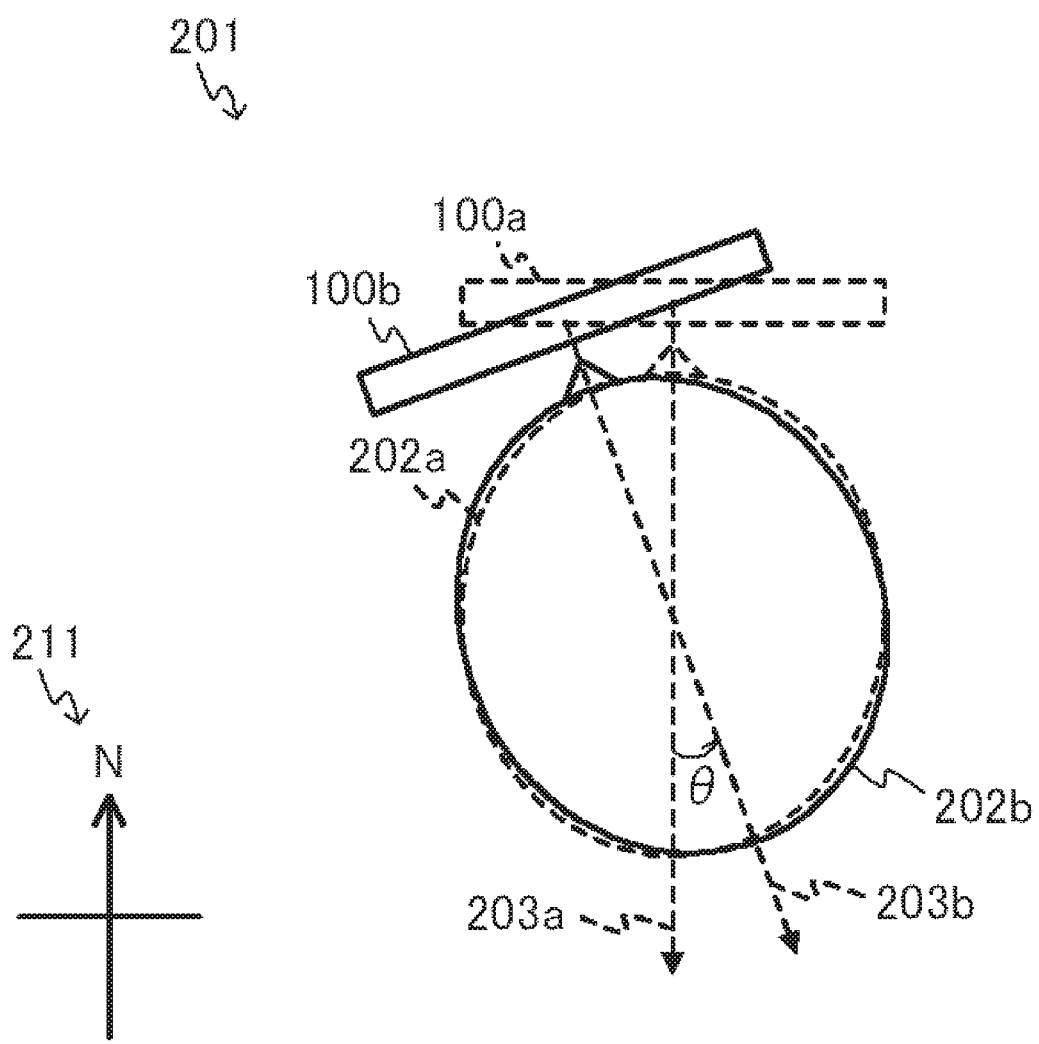
FIG. 3 is a top view of the real space after the shift in orientation of the display device and the user.
Figure 4:
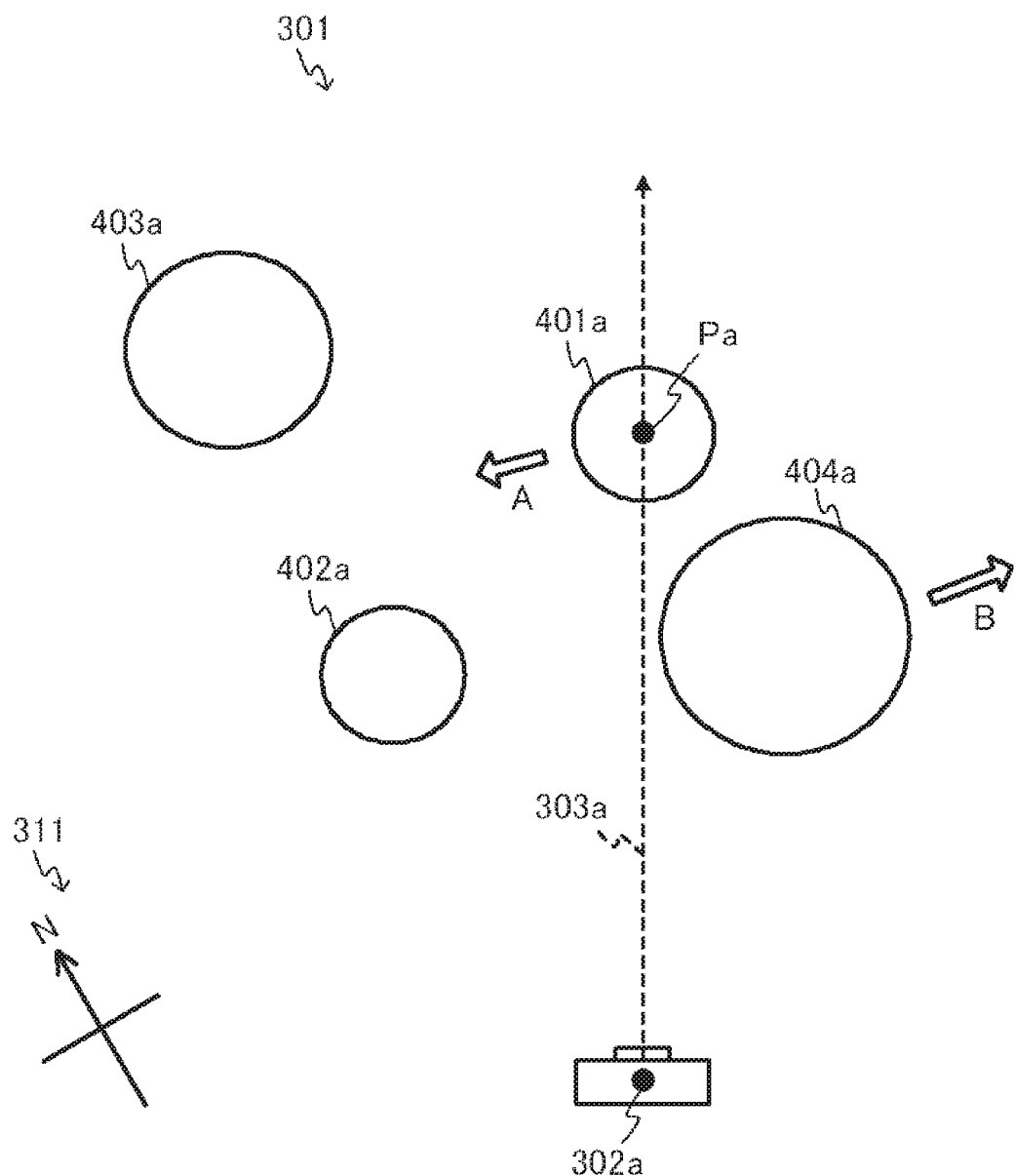
FIG. 4 is a top view of a virtual space before the shift in orientation of the display device and the user in the real space.
Figure 5:
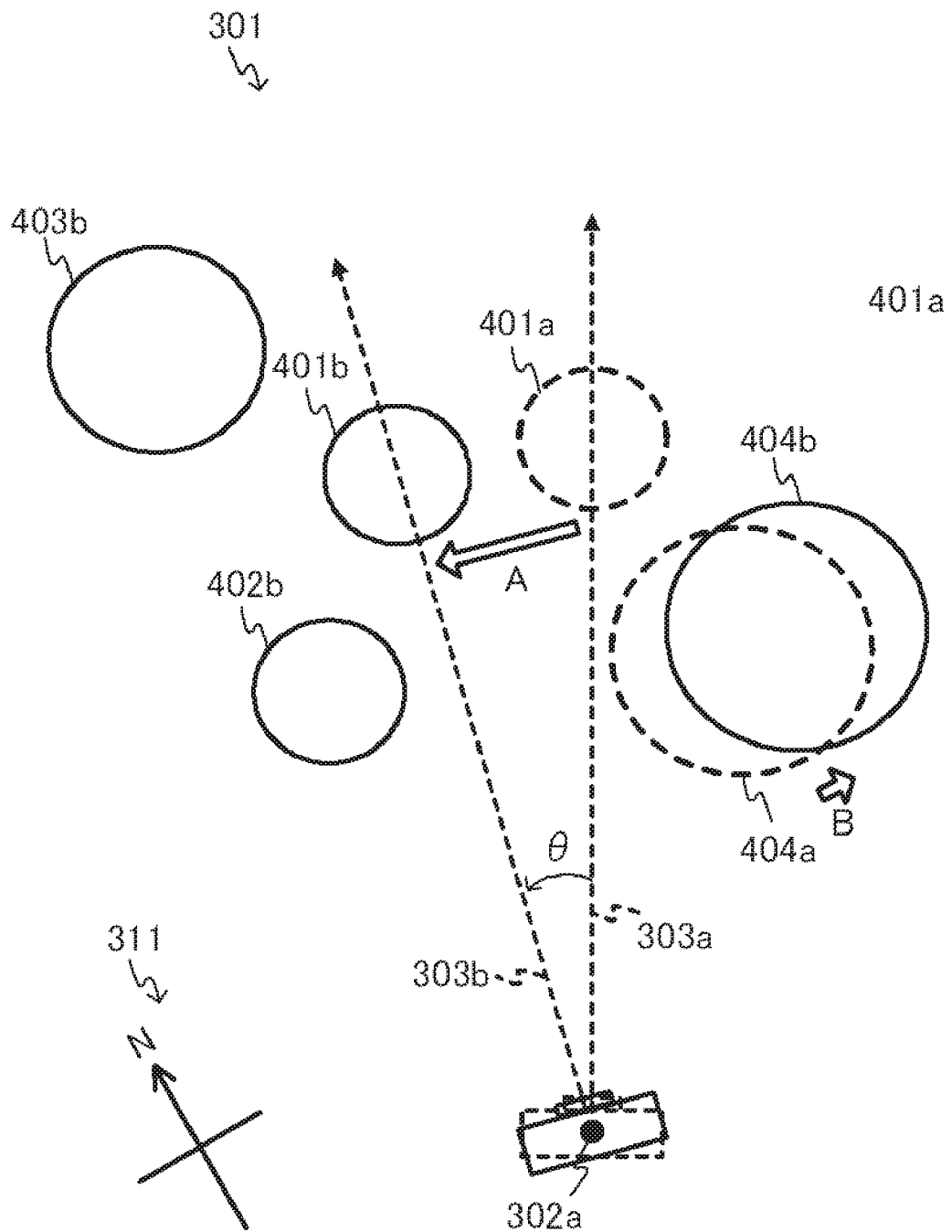
FIG. 5 is a top view of the virtual space after the shift in orientation of the display device and the user in the real space.

The following description is directed to a positional relationship between the display device 100 and a user 202 in a real space 201 and a virtual space (three-dimensional space) 301 displayed in the display device 100 according to the embodiment. FIG. 2 is a top view of the real space 201 at a time $t_a$ before a shift in orientation of the display device 100 and the user 202. FIG. 4 is a top view of the virtual space 301 at the time $t_a$ before the shift in orientation of the display device 100 and the user 202 in the real space 201. FIG. 3 is a top view of the real space 201 at a time $t_b$ after the shift in orientation of the display device 100 and the user 202. FIG. 5 is a top view of the virtual space 301 at the time $t_b$ after the shift in orientation of the display device 100 and the user 202 in the real space 201. The embodiment will be described with reference to these figures. Although the reference symbols in the figures are provided with lower case alphabets as required for representing the elapsed time from the time $t_a$ to the time $t_b$, these lower case alphabets are omitted as required in the following description.

With reference to FIGS. 2 and 3, the user 202 wears the display device 100 in front of the eyes in the real space 201. While the user 202 is wearing the display device 100, a display direction 203 of the display device 100 is opposite to a sight line direction of the user 202 looking at the display device 100.

With reference to FIGS. 4 and 5, still or moving objects 401 to 404 are placed in the virtual space 301. In this embodiment, the objects 402 and 403 remain still, while the object 401 moves in the direction of arrow A and the object 404 moves in the direction of arrow B in the virtual space 301. The objects 401 to 404 are generated by computer graphics. The positions of the objects 401 to 404 in the virtual space 301, their sizes, and shapes, and the moving velocities of the objects 401 and 404 are defined in advance. In an exemplary case where the display device 100 displays a station platform reproduced by computer graphics, examples of the objects 401 and 404 include trains and people moving on the station platform, while examples of the objects 402 and 403 include columns and signboards standing still on the station platform.

It should be noted that an orientation 211 in the real space 201 may be identical to or deviated from an orientation 311 in the virtual space 301. These orientations are deviated from each other in this embodiment.

Figure 6:
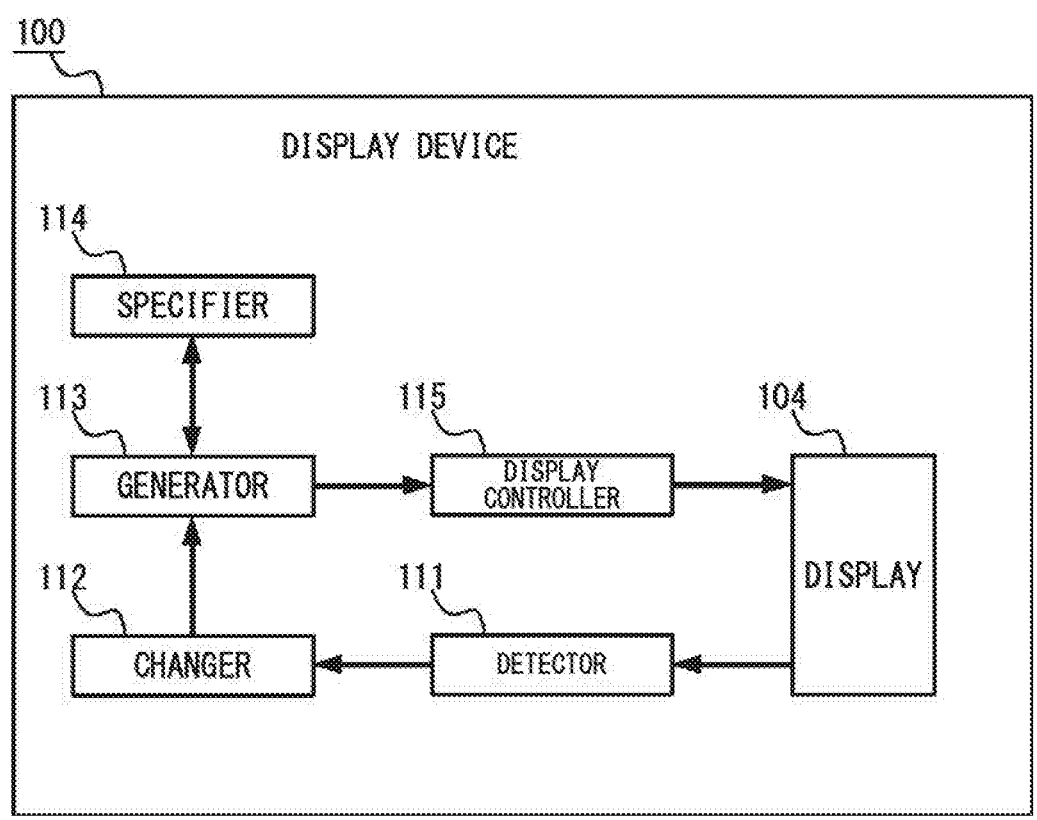
FIG. 6 is a schematic block diagram illustrating a functional configuration of the display device according to the embodiment.

FIG. 6 is a schematic block diagram illustrating a functional configuration of the display device 100 according to the embodiment of the disclosure. As illustrated in FIG. 6, the display device 100 includes a detector 111, a changer 112, a generator 113, a specifier 114, a display controller 115, and a display 104.

The detector 111 detects a shift in orientation of the display device 100 in the real space 201. For example, the detector 111 detects a shift in the display direction 203 of the display device 100 relative to the reference axis in the real space 201 on the basis of the values measured by the sensor unit 105. A typical example of the reference axis in the real space 201 is the gravity direction in the real space 201 or the up-down direction of the display 104 of the display device 100.

In this embodiment, the functions of the detector 111 are performed by cooperation of the control unit 101 and the sensor unit 105.

The changer 112 changes the sight line direction 303 in the virtual space 301 in accordance with the shift in orientation of the display device 100 detected by the detector 111. For example, the changer 112 acquires a rotational angle θ about the reference axis in the real space 201 with reference to the shift in the display direction 203 of the display device 100 from the time $t_a$ until the time $t_b$ detected by the detector 111. Specifically, before the user 202 turns the head, the display direction 203a extends from the display device 100a to the user 202a as illustrated in FIG. 2. After the user 202 turns the head, the display direction 203b extends from the display device 100b to the user 202b as illustrated in FIG. 3. The angle between the display direction 203a and the display direction 203b is defined as the rotational angle θ about the reference axis. The rotational angle θ corresponds to a so-called yaw angle. The user 202 turns the head to the left in FIG. 3.

The interval between the time $t_a$ and the time $t_b$ can be defined depending on the usage. For example, the interval may be a refresh interval (for example, vertical synchronization period) of the display 104 of the display device 100. Since the operation is repeated as explained below, the time $t_b$ in a certain repeating unit is regarded as the time $t_a$ in the subsequent repeating unit.

The changer 112 rotates the sight line direction 303a by the rotational angle θ about the reference axis at the observation site 302a in the virtual space 301, thereby updating the sight line direction 303a to the sight line direction 303b.

In this embodiment, the functions of the changer 112 are performed by the control unit 101.

The generator 113 generates an image representing a view of the virtual space 301 from the observation site 302 in the sight line direction 303. For example, the generator 113 uses a technique, such as perspective projection, to generate the image representing the view from the observation site 302 in the sight line direction 303, on the basis of the certain positions and shapes of the objects 401 to 404 in the virtual space 301.

The specifier 114 specifies at least one focus object determined on a predetermined basis to have a low value of the velocity component, which is not resulting from movement of each of the objects 401 to 404 in the virtual space 301, in the inter-image velocity of the object transferred from one position to another position in respective images generated by the generator 113.

Figure 7A:
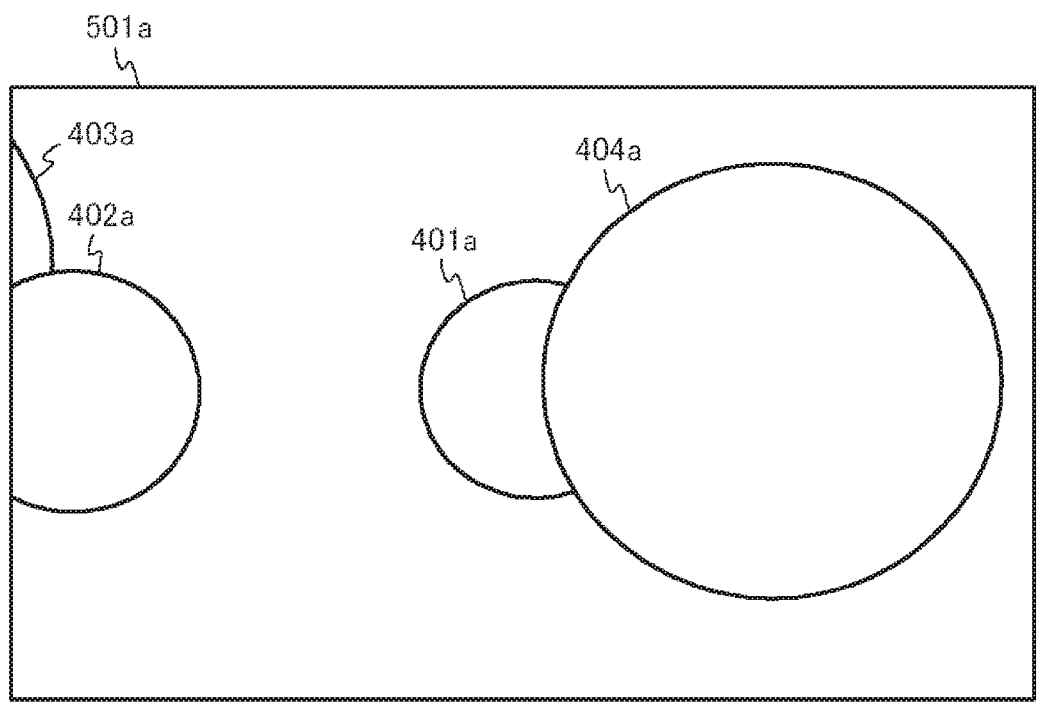
FIG. 7A illustrates an image representing a view of the virtual space from an observation site in a sight line direction before the shift in orientation of the display device and the user in the real space.
Figure 7B:
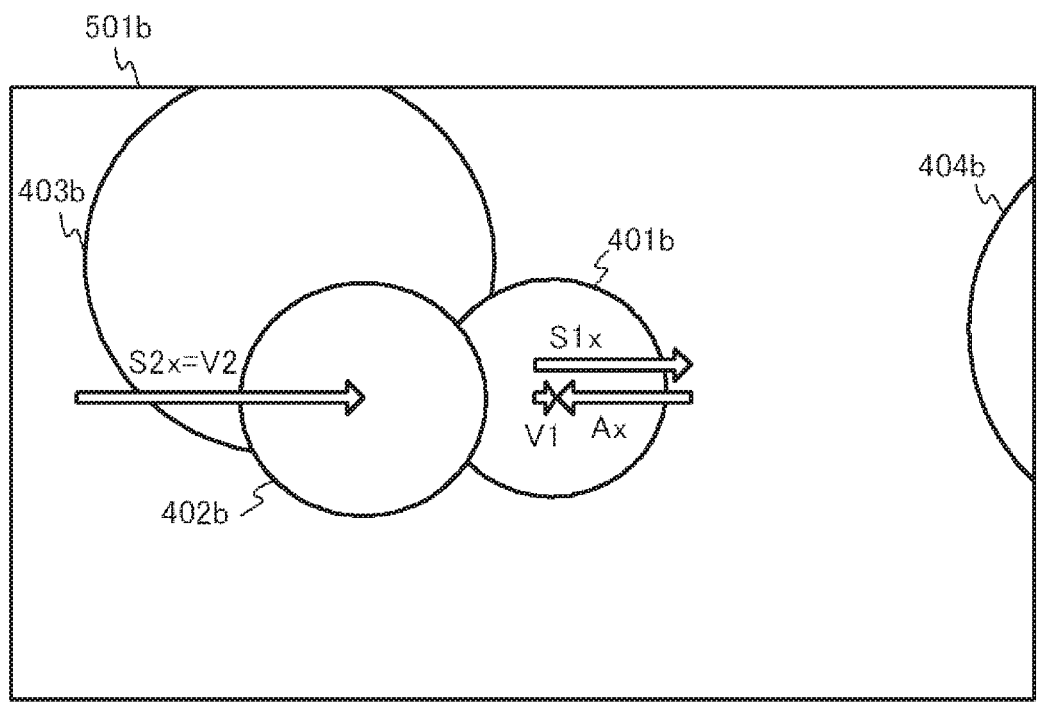
FIG. 7B illustrates an image representing a view of the virtual space from the observation site in the sight line direction after the shift in orientation of the display device and the user in the real space.

The inter-image velocity and the velocity component not resulting from movement of an object will now be described with reference to FIGS. 7A and 7B. FIG. 7A illustrates an image 501a representing a view of the virtual space 301 from the observation site 302 in the sight line direction 303 at the time $t_a$. FIG. 7B illustrates an image 501b representing a view of the virtual space 301 from the observation site 302 in the sight line direction 303 at the time $t_b$. When the sight line direction 303 is changed, each of the still objects 402 and 403 in the virtual space 301 among the objects 401 to 404 is transferred from one position in the generated image 501a to another position in the generated image 501b at an inter-image velocity equal to a velocity component resulting from the change in the sight line direction 303. For example, the object 402 is transferred from one position in the generated image 501a to another position in the generated image 501b at an inter-image velocity V2 equal to a velocity component S2x resulting from the change in the sight line direction 303. In contrast, when the sight line direction 303 is changed, each of the objects 401 and 404 moving in the virtual space 301 is transferred from one position to another position in the respective generated images at an inter-image velocity, which is equal to the resultant velocity from the velocity component resulting from the change in the sight line direction 303 and the velocity component resulting from the movement of the object. For example, the object 401 is transferred from one position in the generated image 501a to another position in the generated image 501b at an inter-image velocity V1, which is equal to the resultant velocity from the velocity component S1x resulting from the change in the sight line direction 303 and the velocity component Ax resulting from the movement of the object. In general, if a user pays attention to a moving object, the user is likely to change the sight line direction 303 in accordance with the movement of the object while capturing the object at the center of the view (that is, the center of the generated image). Accordingly, the focus object to which the user pays attention is expected to have a lower velocity component resulting from the change in the sight line direction 303, that is, a lower velocity component not resulting from the movement of the focus object in the inter-image velocity in comparison to that of the other objects, regardless of the change in the sight line direction 303. In this embodiment, the focus object determined on a predetermined basis to have a low value of the velocity component not resulting from the movement of the object is specified among the objects.

Specifically, the specifier 114 acquires preceding and subsequent positions for each of the objects 401 to 404. The preceding position indicates the position of the object in the virtual space 301 immediately before the change in the sight line direction 303 in the image generated immediately before the change in the sight line direction 303. The subsequent position indicates the position of the object in the image to be generated immediately after the change in the sight line direction 303. More specifically, the specifier 114 calculates preceding positions based on the known positions and moving velocities of the objects 401 to 404 in the virtual space 301, the observation site 302, and the sight line direction 303. The specifier 114 also calculates subsequent positions based on the preceding positions, the transferred observation site 302, and the changed sight line direction 303. The specifier 114 then calculates the difference between the subsequent and preceding positions, as the velocity component resulting from the change in the sight line direction 303, that is, the velocity component not resulting from movement of each object. It should be noted that the specifier 114 regards the positions of the representative points (for example, geometric centers or gravitational centers) of the objects 401 to 404 as the positions of the objects 401 to 404.

Figure 8:
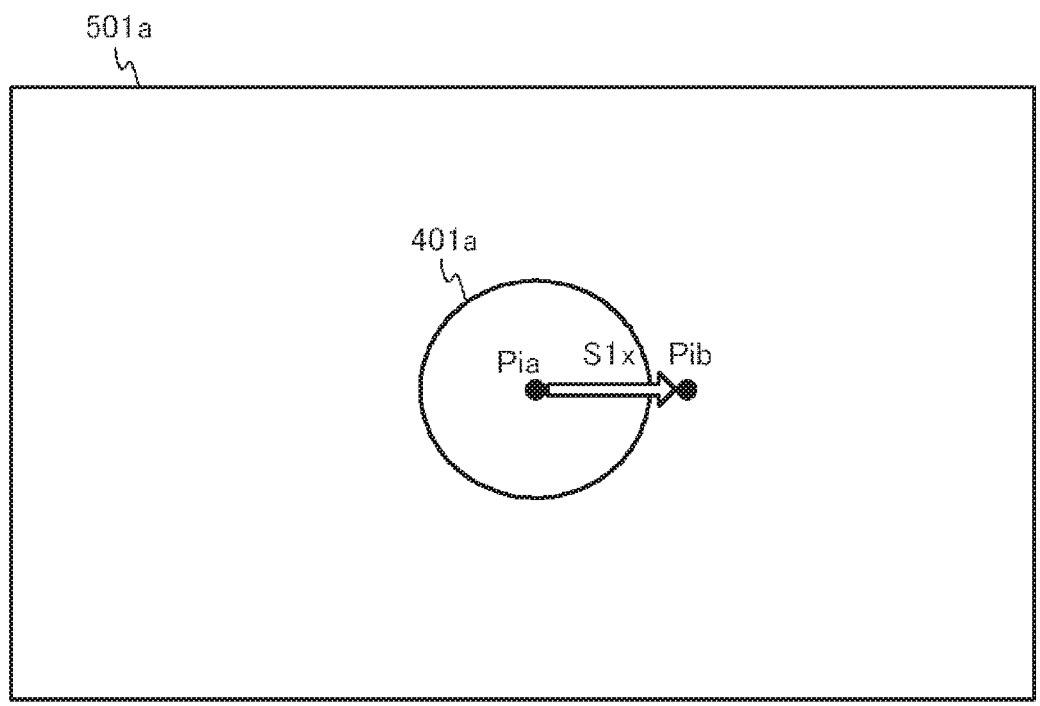
FIG. 8 is a diagram for explaining a method of calculating a velocity component resulting from a change in the sight line direction.

A method of calculating the velocity component resulting from the change in the sight line direction 303 will now be explained focusing on the object 401 with reference to FIG. 8. For example, the object 401 is assumed to be located at a point Pa at the time $t_a$ as illustrated in FIG. 4. In this case, the specifier 114 calculates the position Pia of the point Pa in the image 501a generated at the time $t_a$, based on the point Pa, the observation site 302, and the sight line direction 303. The specifier 114 also calculates the position Pib of the point Pa in the image 501b to be generated at the time $t_b$, based on the point Pa, the observation site 302 at the time $t_b$, and the sight line direction 303 at the time $t_b$. The specifier 114 then calculates the difference between the positions Pib and Pia, as the velocity component S1x resulting from the change in the sight line direction 303. That is, the specifier 114 calculates an inter-image velocity by subtracting the position Pib from the position Pia on the assumption that object 401 remains still, as the velocity component S1x resulting from the change in the sight line direction 303. The specifier 114 calculates a velocity component resulting from the change in the sight line direction 303 for each of the objects 401 to 404 in the virtual space 301 in the same manner.

The specifier 114 then determines whether the velocity component not resulting from the movement of the object is a low value or not on the predetermined basis. In an exemplary method of determining whether the velocity component not resulting from the movement of the object is a low value or not on the predetermined basis, the specifier 114 determines the minimum value of the velocity components resulting from the change in the sight line direction 303 calculated for the individual objects 401 to 404 to be a low value on the predetermined basis. The specifier 114 then specifies at least one focus object among the objects 401 to 404 having the minimum value of the velocity component resulting from the change in the sight line direction 303. For example, when the object 401 has the minimum velocity component S1x of the velocity components of the objects 401 to 404 resulting from the change in the sight line direction 303, the specifier 114 determines the object 401 to be a focus object. Alternatively, the specifier 114 may determine the velocity component to be a low value on a predetermined basis if the velocity component resulting from the change in the sight line direction 303 is a predetermined threshold or less or is less than a predetermined threshold. Alternatively, the specifier 114 may determine the velocity component to be a low value on a predetermined basis if the ratio of the velocity component to the detected change in the sight line direction 303 is less than a predetermined threshold. Specifically, the specifier 114 may determine the velocity component to be a low value on a predetermined basis if the value, which is calculated by dividing the velocity component resulting from the change in the sight line direction 303 by the velocity of the detected change in the sight line direction 303, is less than a predetermined threshold.

In this embodiment, the functions of the specifier 114 are performed by the control unit 101.

Figure 9:
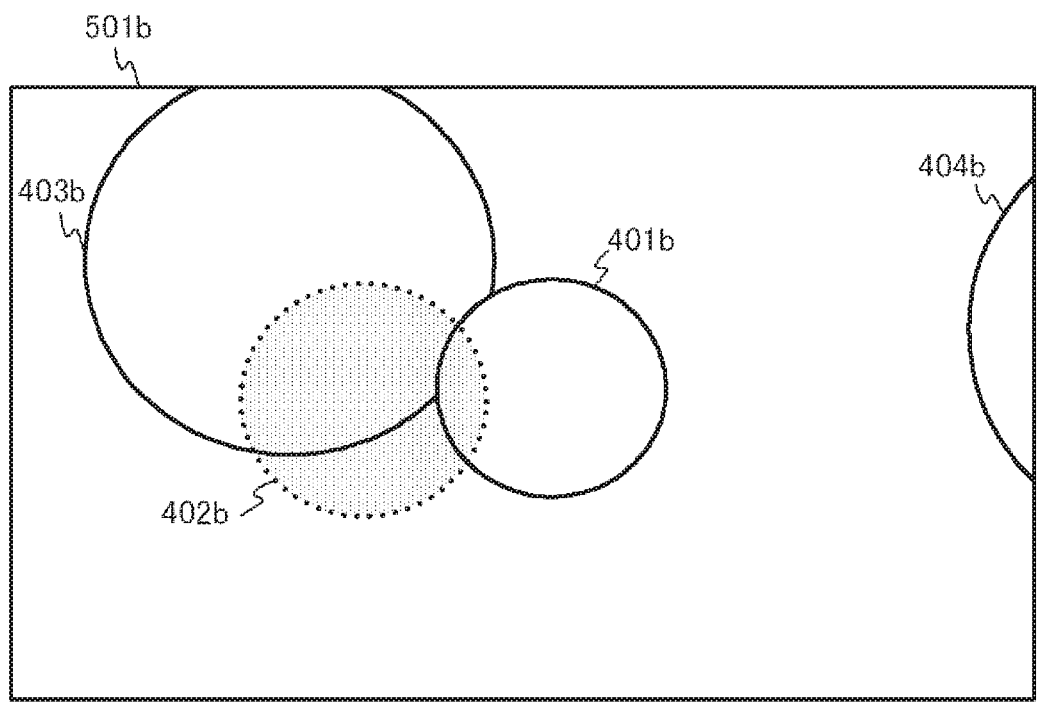
FIG. 9 illustrates an image representing a view of the virtual space from the observation site in the sight line direction after the shift in orientation of the display device and the user in the real space.

The generator 113 increases the transparency of a hiding object, which is an object other than the focus object specified by the specifier 114 among the objects 401 to 404 and which hides the focus object in a view of the virtual space 301 in the sight line direction 303, and then generates an image. For example, the generator 113 renders the background with a certain background color (for example, black) and then renders the objects in the descending order of distance from the observation site 302. If the pixels to represent an object other than the focus object have been provided with a color other than the background color, the generator 113 determines that these pixels have already been provided with the color of the focus object, that is, these pixels correspond to the focus object hidden behind the other object. The generator 113 then determines the other object to be the object hiding the focus object. The generator 113 increases the transparency of the other object and then generates an image. For example, if the specifier 114 determines the object 401 to be the focus object, the generator 113 determines the object 402 to be the object hiding the object 401. The generator 113 then increases the transparency of the object 402 as illustrated in FIG. 9 and then generates the image 501b. The generator 113 increases the transparency of the object 402 and is thus able to generate an image having a high visibility of the portion of the object 401 focused by the user but hidden behind the object 402. In the case where a focus object is hidden behind another focus object, the generator 113 generates an image without increasing the transparency of the other focus object hiding the focus object.

In this embodiment, the functions of the generator 113 are performed by the control unit 101.

The display controller 115 causes the image generated by the generator 113 to be displayed on the display 104. For example, the display controller 115 causes the image 501a illustrated in FIG. 7A at the time $t_a$ and the image 501b illustrated in FIG. 9 at the time $t_b$ to be individually displayed on the display 104.

In this embodiment, the functions of the display controller 115 are performed by the control unit 101.

Figure 10:
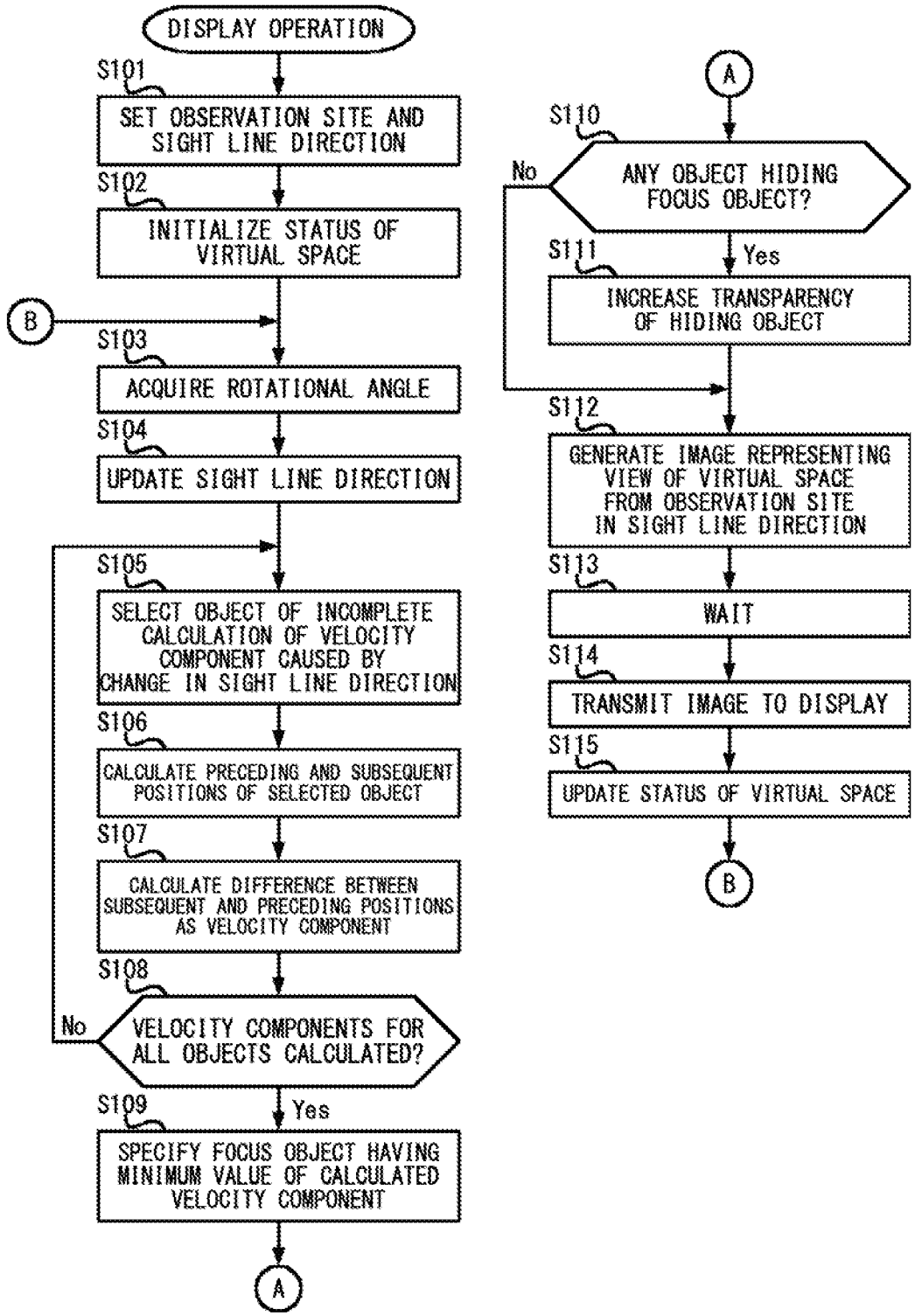
FIG. 10 is a flowchart of a display operation executed by a control unit of the display device according to the embodiment.

The operation of the display device 100 according to the embodiment of the disclosure will now be explained. FIG. 10 is a flowchart of a display operation executed by the control unit 101 of the display device 100. This operation is activated by, for example, reception of an instruction to start this operation by the operation unit 106.

First, the display device 100 sets the observation site 302 and the sight line direction 303 to be the predetermined initial states in the virtual space 301 (Step S101).

The display device 100 then initializes the status of the virtual space 301 (Step S102). In this initialization step, the display device 100 obtains and sets the positions, shapes, orientations, and appearances of objects to be placed in the virtual space 301, and obtains and sets an image of the background supposed to be placed at an infinite distance in the virtual space 301, for example.

The display device 100 then detects the orientation of the display device 100, and acquires the rotational angle θ of the display direction of the display 104 about the reference axis in the real space 201 (Step S103). Since Step S103 is repetitively executed, the acquired rotational angle θ is equivalent to the difference between the display direction 203 previously measured by a sensor or the like and the currently measured display direction 203.

The display device 100 then updates the sight line direction 303 depending on the acquired rotational angle θ (Step S104).

The display device 100 then selects one of the objects 401 to 404 in the virtual space 301 for which the velocity component resulting from the change in the sight line direction 303 has not yet calculated (Step S105).

The display device 100 then calculates the preceding and subsequent positions of the object selected in Step S105 (Step S106).

The display device 100 then calculates the difference between the subsequent and preceding positions calculated in Step S106 as the velocity component resulting from the change in the sight line direction 303 for the selected object (Step S107). The display device 100 then determines whether the velocity components resulting from the change in the sight line direction 303 have been calculated for all the objects 401 to 404 (Step S108). If calculation of the velocity components resulting from by the change in the sight line direction 303 for all the objects 401 to 404 has not yet been completed (Step S108; No), the display device 100 returns to Step S105.

If calculation of the velocity components resulting from the change in the sight line direction 303 for all the objects 401 to 404 has been completed (Step S108; Yes), the display device 100 specifies a focus object having the minimum value of the calculated velocity components (Step S109).

The display device 100 determines whether any object hides the focus object specified in Step S109 (Step S110). If no object hides the focus object (Step S110; No), the display device 100 proceeds to Step S112.

If any object hides the focus object (Step S110; Yes), the display device 100 increases the transparency of the object hiding the focus object by a predetermined degree (Step S111).

The display device 100 then generates an image representing a view of the virtual space 301 from the observation site 302 in the sight line direction 303 (Step S112).

The display device 100 then waits until a vertical synchronization interrupt of the display 104 (Step S113), and transmits the generated image to the display 104 to exhibit the image to the user (Step S114).

The display device 100 then updates the status of the virtual space 301 (Step S115). For example, in the virtual space 301 generated by computer graphics that vary with time, the display device 100 executes a physical simulation for updating the position and orientation of an object using the parameters (for example, velocity, acceleration, angular velocity, and angular acceleration) set in the object, and deforms the object under predetermined conditions.

The display device 100 then returns to Step S103. The display device 100 repeats the above-explained operation, for example, until receiving an instruction to end this operation by the operation unit 106. The repetition period of this operation accords with the vertical synchronization period because of the waiting step (Step S113).

As explained above, the display device 100 according to the embodiment of the disclosure changes the sight line direction 303 in the virtual space 301 in response to a shift in orientation of the display device 100 in the real space 201. The display device 100 then specifies at least one focus object determined on a predetermined basis to have a low value of the velocity component, which is not resulting from the movement of each of the objects 401 to 404 in the virtual space 301, in the inter-image velocity of the object. This configuration enables the display device 100 to specify a focus object of which the movement is being followed by the user's eyes in the virtual space 301, by detection of a shift in orientation of the display device 100 without detection of the position of the display device 100.

In addition, if the specified focus object is hidden behind another object, the display device 100 increases the transparency of the object hiding the focus object and then generates an image. The display device 100 can therefore make the portion of the focus object hidden behind the other object visible.

The above-described embodiment of the disclosure is a mere example and should not be construed as limiting the applicable range of the disclosure. That is, the embodiment of the disclosure can be applied in various manners and a variety of embodiments are encompassed in the scope of the disclosure.

For example, in the above-described embodiment, the display device 100 may enable the user to look into a space behind an obstacle for a focus object by changing the observation site 302 in accordance with the change in the sight line direction 303. The example illustrated in FIG. 11 assumes that a portion of the focus object 401*a* is hidden behind the object 404*a* when the user looks at the focus object 401*a* from the observation site 302*a* in the sight line direction 303*a*. In this example, the user is likely to turn and move the head in the real space 201 to look into a space behind the object 404*a* for the portion of the focus object 401*a*. Unfortunately, the display device 100 without an ability to detect the position of the display device 100 cannot detect the movement of the head of the user. In this case, the display device 100 may detect a turn of the head, that is, a shift in orientation of the display device 100, change the sight line direction 303*a* in the virtual space 301 in accordance with the shift in orientation, and transfer the observation site 302*a* in accordance with the change in the sight line direction 303*a*.

Figure 11:
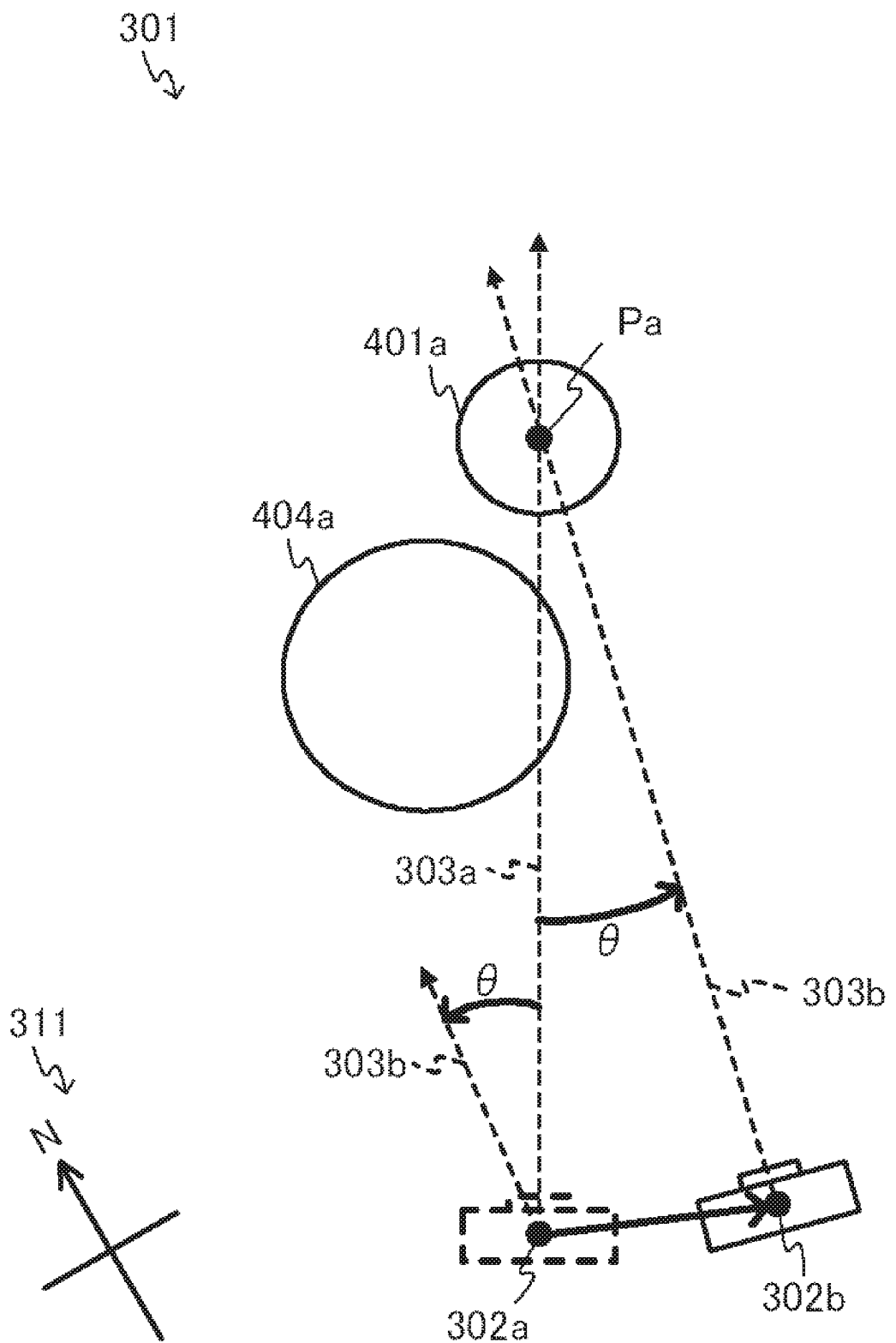
FIG. 11 is a top view of a virtual space after a shift in orientation of a display device and a user in a real space according to a modification.

Specifically, in the above-described embodiment, the changer 112 may change the observation site 302 toward the direction opposite to the direction of change in the sight line direction 303, in accordance with the change in the sight line direction 303. For example, if the user turns the head in the counterclockwise direction by a rotational angle θ from the state illustrated in FIG. 2 at the time $t_a$ to the state illustrated in FIG. 3 at the time $t_b$, the changer 112 acquires the rotational angle θ about the reference axis in the real space 201 based on the shift in the display direction 203 of the display device 100 detected by the detector 111. As illustrated in FIG. 11, the changer 112 then rotates the sight line direction 303*a* by the rotational angle θ about the reference axis at the observation site 302a in the virtual space 301, thereby updating the sight line direction 303a to the sight line direction 303b. The changer 112 also transfers the observation site 302a such that the observation site 302a rotates by the rotational angle θ about the point Pa of the focus object 401a specified by the specifier 114 toward the direction opposite to the direction of change in the sight line direction 303, thereby updating the observation site 302a to the observation site 302b. In the example illustrated in FIG. 11, since the sight line direction 303a is rotated in the counterclockwise direction to become the sight line direction 303b, the changer 112 conducts rotational transfer of the observation site 302a in the clockwise direction by the rotational angle θ to obtain the observation site 302b. This configuration enables the display device 100 to transfer the observation site 302 toward the direction opposite to the direction of change in the sight line direction 303 in accordance with the change in the sight line direction 303, thereby updating the observation site 302 to an observation site appropriate for looking into a space for the focus object while bringing a reduced feeling of strangeness to the user 202, even if the display device 100 has no ability to detect the position of the display device 100.

In the case where a plurality of focus objects are specified, the changer 112 transfers the observation site 302 toward the direction opposite to the direction of change in the sight line direction 303 about one of the focus objects having the minimum value of the velocity component not resulting from the movement of the object, that is, the minimum value of the velocity component resulting from the change in the sight line direction 303. The angle of rotation of the observation site 302 by the changer 112 toward the direction opposite to the direction of change in the sight line direction 303 is not necessarily be equal to the rotational angle θ of the sight line direction 303. For example, the changer 112 may transfer the observation site 302 by a rotational angle proportional to the rotational angle θ of the sight line direction 303 toward the direction opposite to the direction of change in the sight line direction 303.

In the above-described embodiment, the display device 100 detects a shift in orientation of the display device 100 and specifies a focus object based on the shift. Alternatively, the display device 100 may further have an ability to detect the position of the display device 100. In this case, the changer 112 may transfer the observation site 302 in the virtual space 301 in accordance with the detected position of the display device 100.

Figure 12:
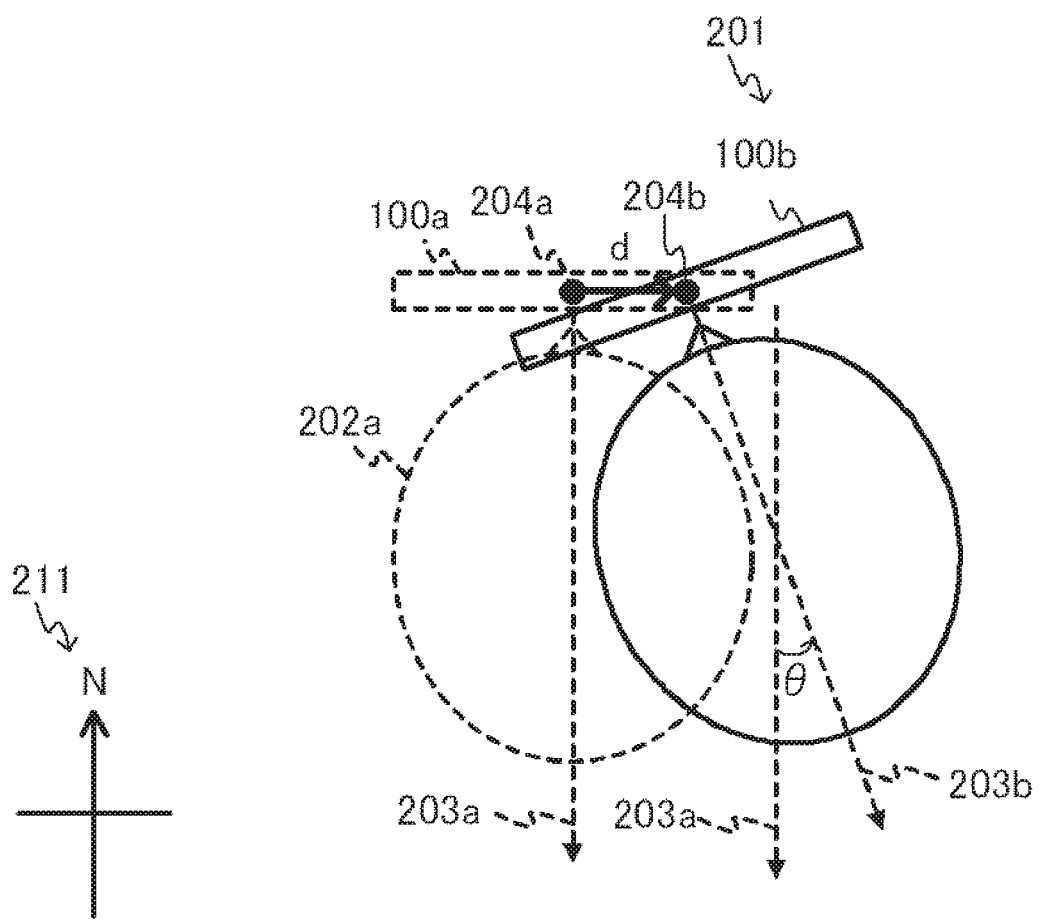
FIG. 12 is a top view of a real space after a shift in orientation and position of a display device and a user according to another modification.
Figure 13:
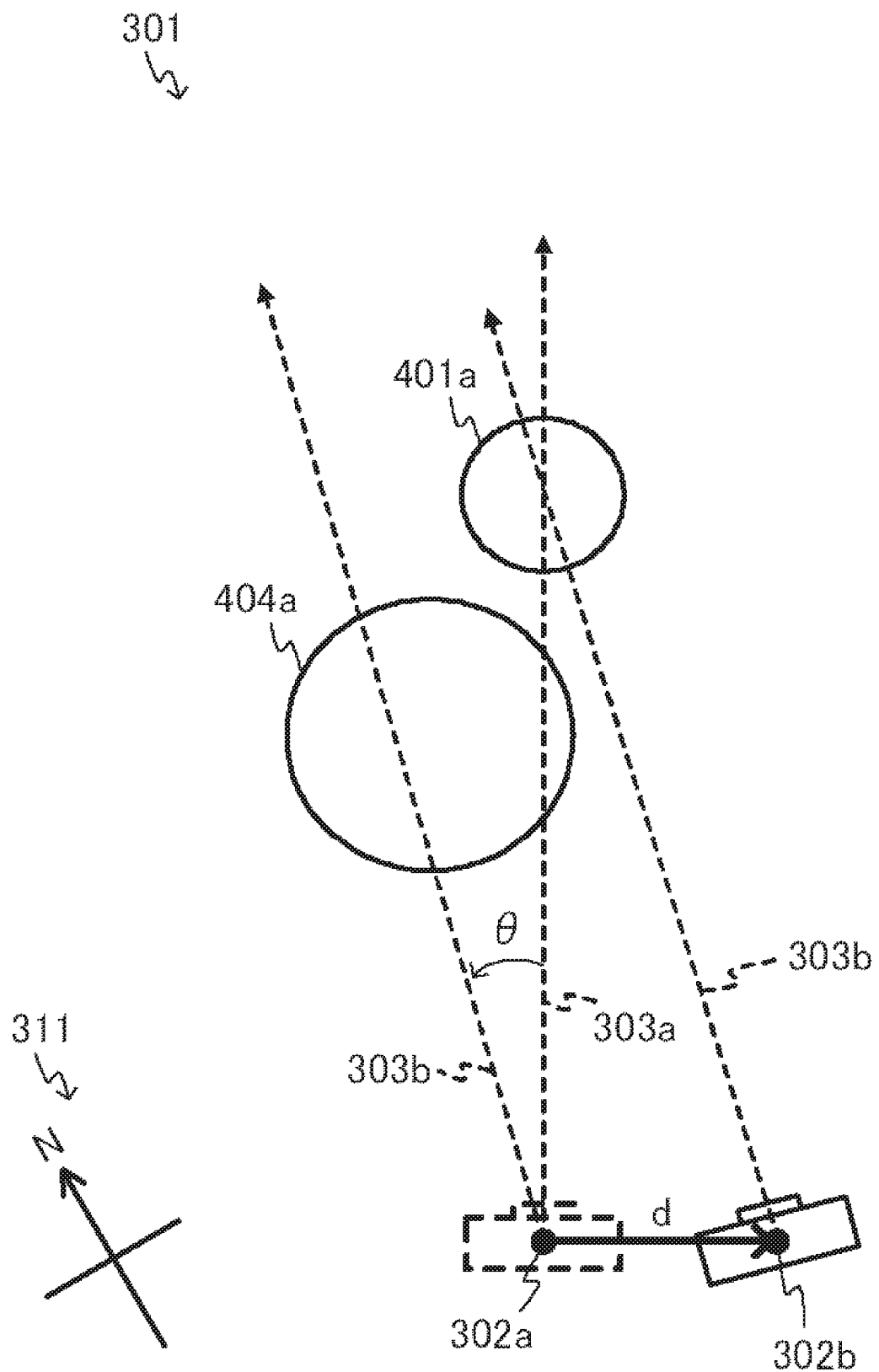
FIG. 13 is a top view of a virtual space after the shift in direction and position of the display device and the user in the real space according to the other modification.

For example, with reference to FIG. 12, the changer 112 acquires a displacement d from the time $t_a$ until the time $t_b$ of a position 204 of the display device 100 detected by the detector 111. Specifically, the representative point (for example, geometric center or gravitational center) of the display device 100 is located at the position 204a before the user 202 turns the head, as illustrated in FIG. 12. The representative point of the display device 100 is located at the position 204b after the user 202 turns the head, as illustrated in FIG. 12. The displacement d of the display device 100 therefore corresponds to the difference vector between the positions 204a and 204b. With reference to FIG. 13, the changer 112 transfers the observation site 302a by the displacement d in the virtual space 301, thereby updating the observation site 302a to the observation site 302b. The generator 113 then generates an image representing a view of the virtual space 301 from the observation site 302b in the sight line direction 303b. The specifier 114 then specifies the focus object determined on a predetermined basis to have a low value of the velocity component, which is not resulting from the movement of the object, in the inter-image velocity of the object transferred from one position to another position in the respective images generated by the generator 113, as in the above-described embodiment.

In general, a display device 100 capable of detecting not only the orientation but also the position of the display device 100 is expected to specify a focus object at the intersection of the previous and current sight line directions 303, assuming that the user changes the sight line direction while capturing the focus object at the center of the view. Unfortunately, the display device 100 having a low accuracy of detecting the orientation and position of the display device 100 possibly fails to properly determine the intersection. In contrast, the disclosed specifier 114 specifies the focus object determined on a predetermined basis to have a low value of the velocity component, which is not resulting from the movement of the object, in the inter-image velocity of the object transferred from one position to another position in the respective images generated by the generator 113, and can therefore specify the focus object despite of a low accuracy of detecting the orientation and position of the display device 100.

In the above-described embodiment, the display device 100 specifies a focus object in response to detection of a shift in orientation of the display device 100. That is, the display device 100 stops specification of a focus object while the display device 100 is maintaining the orientation in the above-described embodiment. Alternatively, the display device 100 may specify the most lately specified focus object again, for example, for a predetermined period from the most lately detection of a shift in orientation of the display device 100. No detection of a shift in orientation of the display device 100 seems to occur because the user has already turned the display device 100 to the direction appropriate for observation of the focus object. The display device 100 can thus specify the most lately specified focus object again for a predetermined period from the most lately detection of a shift in orientation of the display device 100, despite of no detection of a shift in orientation of the display device 100.

In the above-described embodiment, the specifier 114 specifies the focus object having the minimum value of the velocity component, which is not resulting from the movement of the object, in the inter-image velocity of the object transferred from one position to another position in the respective images generated by the generator 113. In such a case where the specifier 114 specifies a single focus object, the focus object may be frequently switched in some situations. In order to prevent the frequent switching of the focus object, for example, the display device 100 may stop specification of another focus object for a predetermined period from specification of one focus object.

Although the display device 100 detects a shift in yaw angle as a shift in orientation of the display device 100 in the above-described embodiment, this configuration should not be construed as limiting the invention. The display device 100 may also detect, for example, a shift in roll or pitch angle as a shift in orientation of the display device 100.

The above-described functions of the display device 100 may be achieved by hardware including various electric and electronic devices. Alternatively, these functions may be achieved by, for example, electric and electronic circuits and controllers installed in an existing personal computer or information terminal, to configure the display device 100.

Alternatively, the display 104 and the sensor unit 105 of the display device 100 may be configured by a head mounted display, and the display control device including the control unit 101, the ROM 102, and the RAM 103 of the display device 100 may be configured by a personal computer or information terminal connected to the head mounted display, for example.

Alternatively, the functions of the display device 100 may be achieved by an existing personal computer or information terminal by installation of a program for providing the functional configuration of the display device 100 demonstrated in the above embodiment and by execution of the program in a CPU or the like that controls the personal computer or information terminal. The CPU or the like executes the program and can thus perform the display control method for controlling the display device 100.

This program may be applied in any procedure other than the above example. For example, the program may be stored in a non-transitory computer-readable recording medium, such as a compact disc read-only memory (CD-ROM), digital versatile disc (DVD), or magneto optical disc (MO), for example. Alternatively, the program may be stored in a storage on a network, such as the Internet to be downloaded.

(Conclusion)

As described above, a display control device according to a first aspect of the disclosure controls a display device and includes: a changer configured to change a sight line direction in a virtual space, which includes a plurality of still and moving objects in accordance with a shift in orientation of the display device in a real space; a generator configured to generate an image representing a view of the virtual space in the sight line direction; a display controller configured to cause the generated image to be displayed on a display included in the display device; and a specifier configured to specify a focus object among the objects. The changer transfers an observation site about the focus object toward a direction opposite to a direction of change in the sight line direction. The generator generates the image representing a view of the virtual space from the observation site in the sight line direction.

In the display control device according to the first aspect, the specifier may specify the focus object determined on a predetermined basis to have a low value of the velocity component, which is not resulting from movement of the object in the virtual space, in an inter-image velocity of the object transferred from one position to another position in respective images.

In the display control device according to the first aspect, if the specifier specifies a plurality of focus objects, the changer may transfer the observation site about one of the focus objects having a minimum value of the velocity component.

In the display control device according to the first aspect, the specifier may acquire a preceding position and a subsequent position for each of the objects, the preceding position being a position of the object in the virtual space immediately before the change in the sight line direction in an image generated immediately before the change in the sight line direction, the subsequent position being a position of the object in an image to be generated immediately after the change in the sight line direction. The specifier may use a difference between the subsequent position and the preceding position as the velocity component of the object.

In the display control device according to the first aspect, the object having a minimum value of the velocity component may be determined on the predetermined basis to have a low value.

In the display control device according to the first aspect, the object having the velocity component of a predetermined threshold or less may be determined on the predetermined basis to have a low value.

In the display control device according to the first aspect, the object having the velocity component of which a ratio to the shift in orientation is less than a predetermined threshold may be determined on the predetermined basis to have a low value.

In the display control device according to the first aspect, the changer may transfer the observation site in accordance with the change in the sight line direction.

In the display control device according to the first aspect, the changer may transfer the observation site at an amount in proportion to an amount of the change in the sight line direction.

In the display control device according to the first aspect, the generator may increase a transparency of another object other than the focus object among the objects, the other object hiding the focus object in a view of the virtual space in the sight line direction, and then generate an image.

A display control method according to a second aspect of the disclosure is performed by a display control device for controlling a display device. The method includes: a changing step of changing a sight line direction in a virtual space, which includes a plurality of still and moving objects, by the display control device in accordance with a shift in orientation of the display device in a real space; a generating step of generating an image representing a view of the virtual space in the sight line direction by the display control device; a displaying step of causing the generated image to be displayed on a display included in the display device by the display control device; and a specifying step of specifying a focus object among the objects by the display control device. An observation site is transferred about the focus object toward a direction opposite to a direction of change in the sight line direction in the changing step. The image representing a view of the virtual space from the observation site in the sight line direction is generated in the generating step.

A program according to a third aspect of the disclosure causes a computer to function as: a changer configured to change a sight line direction in a virtual space, which includes a plurality of still and moving objects, in accordance with a shift in orientation of a display device in a real space; a generator configured to generate an image representing a view of the virtual space in the sight line direction; a display controller configured to cause the generated image to be displayed on a display included in the display device; and a specifier configured to specify a focus object among the objects. The changer transfers an observation site about the focus object toward a direction opposite to a direction of change in the sight line direction. The generator generates the image representing a view of the virtual space from the observation site in the sight line direction.

A non-transitory computer-readable information recording medium according to a fourth aspect of the disclosure stores a program thereon. The program causes a computer to function as: a changer configured to change a sight line direction in a virtual space, which includes a plurality of still and moving objects, in accordance with a shift in orientation of a display device in a real space; a generator configured to generate an image representing a view of the virtual space in the sight line direction; a display controller configured to cause the generated image to be displayed on a display included in the display device; and a specifier configured to specify a focus object among the objects. The changer transfers an observation site about the focus object toward a direction opposite to a direction of change in the sight line direction. The generator generates an image representing a view of the virtual space from the observation site in the sight line direction.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure can provide a display control device that causes a display device to display a view of a virtual space or the like from an observation site in the virtual space or the like and appropriately transfers the observation site in the virtual space or the like without detection of the position of the display device in a real space, and can provide a display control method, a program, and a non-transitory computer-readable information recording medium.

REFERENCE SIGNS LIST 100 (100a, 100b) Display device
101 Control unit
102 ROM
103 RAM
104 Display
105 Sensor unit
106 Operation unit
107 Bus
111 Detector
112 Changer
113 Generator
114 Specifier
115 Display controller
201 Real space
202 (202a, 202b) User
203 (203a, 203b) Display direction
204 (204a, 204b) Position of a display device
211 Orientation in a real space
301 Virtual space
302 (302a, 302b) Observation site
303 (303a, 303b) Sight line direction
311 Orientation in a virtual space
401 to 404 (401a to 404a, 401b to 404b) Object
501a, 501b Image

The invention claimed is:

1. A display control device for controlling a display device, the display control device comprising:
at least one memory configured to store computer program code; and
at least one processor configured to access said at least one memory, read said computer program code, and operate as instructed by said computer program code, said computer program code including:
generator code configured to cause at least one of said at least one processor to generate an image representing a view of a virtual space, observed from a virtual viewpoint in a sight line direction, the virtual space including a plurality of still and moving objects;
display controller code configured to cause at least one of said at least one processor to control the display device to display the generated image on a display included in the display device;
specifier code configured to cause at least one of said at least one processor to specify a focus object among the plurality of still and moving objects; and
changer code configured to cause at least one of said at least one processor to change the virtual viewpoint from an original virtual viewpoint to a transferred virtual viewpoint based on a shift in orientation of the display device in a real space, wherein
the display controller code is further configured to cause at least one of said at least one processor to control the display device to display an image representing a changed view of the virtual space in accordance with the transferred virtual viewpoint, and
the changer code is configured to cause at least one of said at least one processor to:
determine, based on the shift in orientation of the display device in the real space, a rotation angle by which the display device rotates with respect to a reference axis in the real space and a rotation direction; and
change the virtual viewpoint from the original virtual viewpoint to the transferred virtual viewpoint by rotating the sight line direction around the focus object by the rotation angle in a direction opposite the rotation direction with respect to the reference axis.

2. The display control device according to claim 1, wherein the specifier code is configured to cause at least one of said at least one processor to specify the focus object determined on a predetermined basis to have a low value of a velocity component in an inter-image velocity of the focus object transferred from one position to another position in respective images, the velocity component not resulting from movement of the focus object in the virtual space.

3. The display control device according to claim 2, wherein if a plurality of focus objects are determined on the predetermined basis, the changer code is further configured to cause at least one of said at least one processor to transfer the virtual viewpoint around one of the plurality of focus objects having a minimum value of the velocity component.

4. The display control device according to claim 2, wherein
the specifier code is further configured to cause at least one of said at least one processor to acquire a preceding position and a subsequent position for each of the plurality of still and moving objects, the preceding position being a position of an object in the virtual space immediately before the change in the sight line direction in an image generated immediately before the change in the sight line direction, the subsequent position being a position of the object in an image to be generated immediately after the change in the sight line direction, and
the specifier code is further configured to cause at least one of said at least one processor to specify a difference between the subsequent position and the preceding position as the velocity component of the object.

5. The display control device according to claim 2, wherein the focus object having a minimum value of the velocity component is determined on the predetermined basis to have the low value.

6. The display control device according to claim 2, wherein the focus object having the velocity component of a predetermined threshold or less is determined on the predetermined basis to have the low value.

7. The display control device according to claim 2, wherein the focus object having the velocity component of which a ratio to the shift in orientation is less than a predetermined threshold is determined on the predetermined basis to have the low value.

8. The display control device according to claim 1, wherein the changer code is further configured to cause at least one of said at least one processor to transfer the virtual viewpoint in accordance with the change in the sight line direction.

9. The display control device according to claim 8, wherein the changer code is further configured to cause at least one of said at least one processor to transfer the virtual viewpoint at an amount in proportion to the change in the sight line direction.

10. The display control device according to claim 1, wherein the generator code is further configured to cause at least one of said at least one processor to increase a transparency of another object other than the focus object among the plurality of still and moving objects, the another object hiding the focus object in the view of the virtual space, observed from the virtual viewpoint in the sight line direction, and then generate the image.

11. The display control device according to claim 1, further comprising:
   initialization code configured to cause at least one of said at least one processor to initialize the virtual viewpoint and the sight line direction in the virtual space.

12. A display control method performed by a display control device for controlling a display device, the method comprising:
   generating an image representing a view of a virtual space, observed from a virtual viewpoint in a sight line direction by the display control device, the virtual space including a plurality of still and moving objects;
   displaying the generated image on a display included in the display device by the display control device;
   specifying a focus object among the plurality of still and moving objects by the display control device;
   changing the virtual viewpoint, from an original virtual viewpoint to a transferred virtual viewpoint based on a shift in orientation of the display device in a real space; and
   displaying an image representing a changed view of the virtual space in accordance with the transferred virtual viewpoint on the display included in the display device by the display control device,
   wherein the changing the virtual viewpoint comprises:
   determining, based on the shift in orientation of the display device in the real space, a rotation angle by which the display device rotates with respect to a reference axis in the real space and a rotation direction; and
   changing the virtual viewpoint from the original virtual viewpoint to the transferred virtual viewpoint by rotating the sight line direction around the focus object by the rotation angle in a direction opposite the rotation direction with respect to the reference axis.

13. The display control method according to claim 12, further comprising:
   initializing the virtual viewpoint and the sight line direction in the virtual space.

14. A non-transitory computer-readable information recording medium storing a program thereon, the program is configured to cause at least one processor to:
   generate an image representing a view of a virtual space, observed from a virtual viewpoint in a sight line direction, the virtual space including a plurality of still and moving objects;
   control, the generated image, on a display screen included in a display device;
   specify a focus object among the plurality of still and moving objects;
   change the virtual viewpoint from an original virtual viewpoint to a transferred virtual viewpoint based on a shift in orientation of the display device in a real space;
   control an image representing a changed view of the virtual space to be displayed in accordance with the transferred virtual viewpoint on the display included in the display device,
   wherein, in changing the virtual viewpoint, the program causes the at least one processor to:
   determine, based on the shift in orientation of the display device in the real space, a rotation angle by which the display device rotates with respect to a reference axis in the real space and a rotation direction; and
   change the virtual viewpoint from the original virtual viewpoint to the transferred virtual viewpoint by rotating the sight line direction around the focus object by the rotation angle in a direction opposite the rotation direction with respect to the reference axis.

15. The non-transitory computer-readable information recording medium according to claim 14, wherein the program further causes the at least one processor to:
   initialize the virtual viewpoint and the sight line direction in the virtual space.

\* \* \* \* \*